(12) United States Patent
Carru et al.

(10) Patent No.: US 11,983,292 B2
(45) Date of Patent: *May 14, 2024

(54) NATIVE APPLICATIONS USING DATABASE ROLES

(71) Applicant: Snowflake Inc., Bozeman, MT (US)

(72) Inventors: Damien Carru, New York, NY (US);
Jeremy Yujui Chen, Waterloo (CA);
Pui Kei Johnston Chu, Unionville (CA); Thierry Cruanes, San Mateo, CA (US); Istvan Cseri, Seattle, WA (US); Benoit Dageville, San Carlos, CA (US); Unmesh Jagtap, San Mateo, CA (US); Subramanian Muralidhar, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,950

(22) Filed: Feb. 13, 2023

(65) Prior Publication Data

US 2023/0185952 A1    Jun. 15, 2023

Related U.S. Application Data

(63) Continuation of application No. 17/885,335, filed on Aug. 10, 2022, now Pat. No. 11,593,509, which is a
(Continued)

(51) Int. Cl.
*G06F 21/62* (2013.01)
*G06F 9/445* (2018.01)
*G06Q 30/06* (2023.01)

(52) U.S. Cl.
CPC ...... *G06F 21/6227* (2013.01); *G06F 9/44505* (2013.01); *G06Q 30/06* (2013.01); *G06F 2221/2141* (2013.01)

(58) Field of Classification Search
CPC ............ G06F 21/6227; G06F 9/44505; G06F 2221/2141; G06F 8/61; G06Q 30/06
See application file for complete search history.

(56) References Cited

U.S. PATENT DOCUMENTS 7,069,271 B1    6/2006  Fadel et al.
9,942,409 B1    4/2018  Blomgren et al.
(Continued)

FOREIGN PATENT DOCUMENTS

WO        0241105 A2    5/2002

OTHER PUBLICATIONS

"Sharing Data Securely in Snowflake—Snowflake Documentation", Mar. 27, 2021, pp. 1-119, located at https://web.archive.org/web/20210120193756/https://docs.snowflake.com/en/user-guide-data-share.html.
(Continued)

*Primary Examiner* — Mohammad W Reza
(74) *Attorney, Agent, or Firm* — WOMBLE BOND DICKINSON (US) LLP

(57) ABSTRACT

Embodiments of the present disclosure enable users of a data sharing system to build native applications that can be shared with other users of the data sharing system. The native applications can be published and discovered in the data sharing system like any other data listing, and consumers can install them in their local data sharing system account to serve their data processing needs. A provider may define an installation script for installing an application and create a share object to which the installation script may be attached. In response to an imported database being created in a consumer account based on the share object, a native application framework may automatically execute the instal-
(Continued)

lation script in the consumer account and may create a set of database roles to manage execution of the application in the consumer account.

20 Claims, 11 Drawing Sheets

Related U.S. Application Data continuation of application No. 17/535,529, filed on Nov. 24, 2021, now Pat. No. 11,436,362.

(60) Provisional application No. 63/273,814, filed on Oct. 29, 2021.

(56) References Cited

U.S. PATENT DOCUMENTS

| | | | |
|---|---|---|---|
| 11,169,997 B1* | 11/2021 | Debo | G06F 16/2428 |
| 2010/0205530 A1* | 8/2010 | Butin | G06F 9/453 |
| | | | 715/765 |
| 2016/0357581 A1* | 12/2016 | Jiang | G06F 9/44526 |
| 2017/0075919 A1 | 3/2017 | Bose et al. | |
| 2017/0220330 A1 | 8/2017 | Soini et al. | |
| 2018/0007167 A1 | 1/2018 | Biron | |
| 2018/0152460 A1 | 5/2018 | Lin et al. | |
| 2019/0303274 A1* | 10/2019 | Funnell | G06F 11/3696 |
| 2020/0150943 A1 | 5/2020 | Singh et al. | |
| 2020/0285450 A1 | 9/2020 | Das et al. | |
| 2022/0200978 A1* | 6/2022 | Ho | H04L 63/08 |

OTHER PUBLICATIONS

"Sharing Data Securely in Snowflake—Snowflake Documentation", Mar. 27, 2021, located at https://web.archive.org/web/20210120193756/https://docs.snowflake.com/en/user-guide-data-share.html.

European Search Report of Application No. 22204595.7 dated Mar. 2, 2023, 12 pages.

* cited by examiner

```
1  // provider
2  use role accountadmin;
3  create or replace warehouse wh;
4
5  // create db, schema, installer
6  create database time_db;
7  create schema time_db.installer_schema;
8
9  create or replace procedure time_db.installer_schema.installer()
10   returns string
11   language javascript
12   execute as owner
13   as $$
14   snowflake.execute({ sqlText: `create schema time_schema` });
15   snowflake.execute({ sqlText: `create table time_schema.time_table(ts timestamp)` });
16
17   snowflake.execute({ sqlText: `create procedure time_schema.record_time()
18     returns string
19     language javascript
20     execute as owner as
21     \$\$
22     snowflake.execute({
23       sqlText: \`insert into time_schema.time_table values(CURRENT_TIMESTAMP)\` });
24
25     return "CURRENT TIMESTAMP RECORDED";
26     \$\$
27   `});
28
29   snowflake.execute({ sqlText: `create procedure time_schema.start_service(wh_name string)
30     returns string
31     language javascript
32     execute as owner as
33     \$\$
34     var create_task_cmd =
35       "create task if not exists time_schema.insert_time warehouse = "
36       + WH_NAME
37       + " schedule = '1 MINUTE'"
38       + " as call time_schema.record_time()";
39     snowflake.execute({ sqlText: create_task_cmd });
40
41     snowflake.execute({ sqlText: \`alter task time_schema.insert_time resume\` });
42     return "SERVICE STARTED";
43     \$\$
44   `});
45
46   snowflake.execute({
47     sqlText: `grant usage on schema time_schema to database role app_exporter`
48   });
49
50   snowflake.execute({
51     sqlText: `grant usage on procedure time_schema.start_service(string) to database role app_exporter`
52   });
53
54   snowflake.execute({
55     sqlText: `grant select on table time_schema.time_table to database role app_exporter`
56   });
57
58   return "Installer Done";
59  $$
```

```
// create application share
create share time_share installer = time_db_installer_schema_installer();

// grant privileges to the app share
grant usage on database time_db to share time_share;
grant usage on schema installer_schema to share time_share;
grant usage on private installer_schema_installer() to share time_share;
alter share time_share accounts = nativeappsorg.native_apps_consumer[];
```
← 510

NATIVE APPLICATIONS USING DATABASE ROLES

CROSS REFERENCE TO RELATED APPLICATIONS

This application is a continuation of co-pending U.S. patent application Ser. No. 17/885,335 filed on Aug. 10, 2022, which is a continuation of U.S. patent application Ser. No. 17/535,529 (U.S. Pat. No. 11,436,362) filed on Nov. 24, 2021, which claims priority to Provisional Application No. 63/273,814 filed on Oct. 29, 2021, and entitled "Native Applications Using Database Roles", which are hereby incorporated by reference.

TECHNICAL FIELD

The present disclosure relates to data sharing platforms, and particularly to sharing applications within a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 5A-5C are diagrams illustrating a code implementation of the application sharing techniques described in FIG. 4, in accordance with some embodiments of the present invention.

DETAILED DESCRIPTION

Figure 1A:
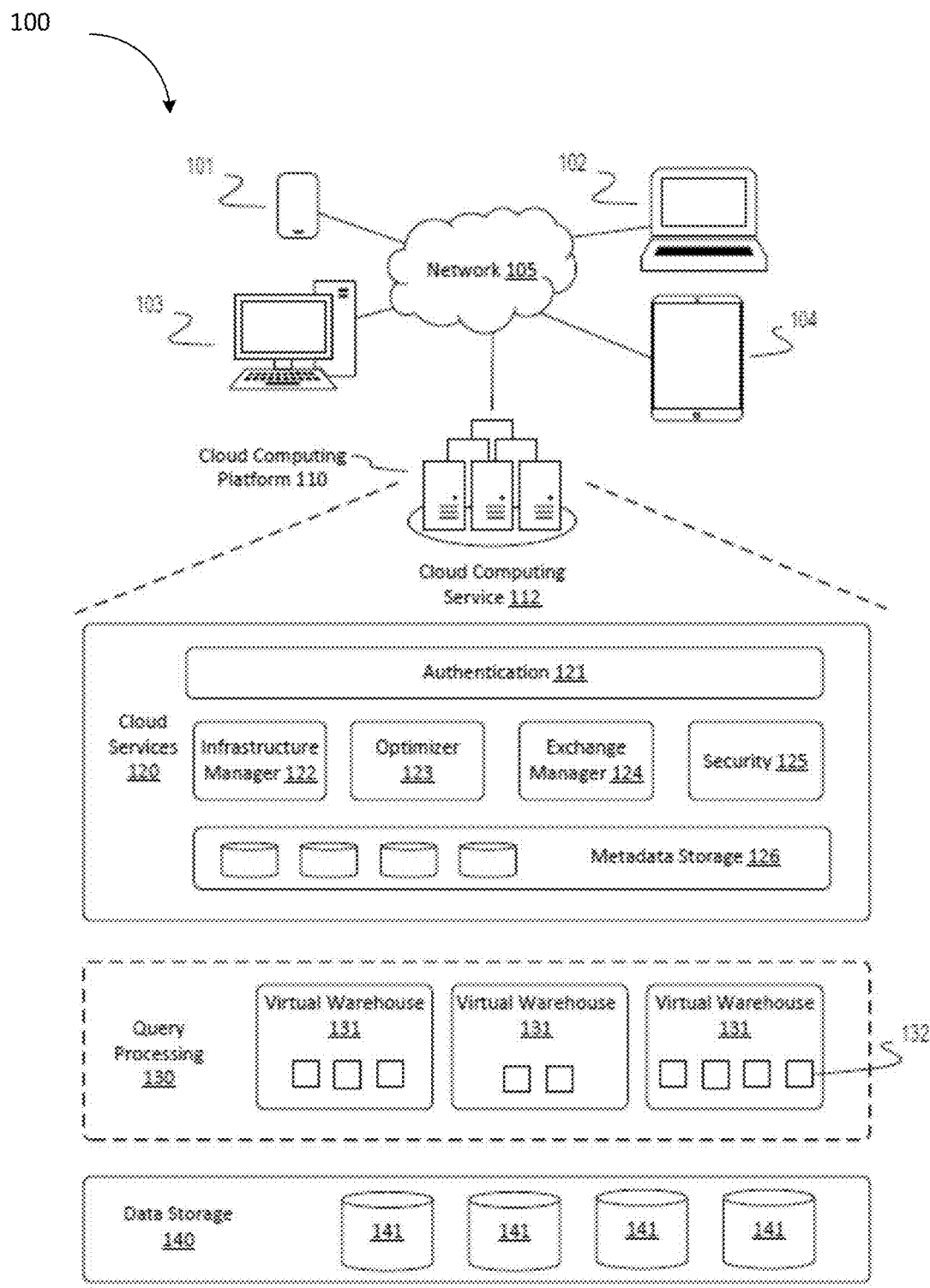
FIG. 1A is a block diagram depicting an example computing environment in which the methods disclosed herein may be implemented, in accordance with some embodiments of the present invention.

Data providers often have data assets that are cumbersome to share. A data asset may be data that is of interest to another entity. For example, a large online retail company may have a data set that includes the purchasing habits of millions of consumers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

Consumers of data often require the ability to perform various functions on data that has been shared with them. This often involves a consumer having to share data with one or more third parties, having those third parties run a service on it, and sending the results back to the consumer. In addition to the latency created as a result of having to utilize a third party service, consumers are required to share their potentially sensitive data with these third parties.

Embodiments of the present disclosure address the above noted and other problems by enabling users of a data marketplace to build native applications that can be shared with other users of the data marketplace. The native applications can be published and discovered in the data marketplace like any other data listing, and consumers can install them in their local data marketplace account to serve their data processing needs. This helps to bring data processing services and capabilities to consumers instead of requiring a consumer to share data with e.g., a service provider who can perform these data processing services and share the processed data back to the consumer. Stated differently, instead of a consumer having to share potentially sensitive data with a third party who can perform the necessary data processing services and send the results back to the consumer, the desired data processing functionality may be encapsulated, and then shared with the consumer so that the consumer does not have to share their potentially sensitive data. Embodiments of the present disclosure also protect providers, who may not want underlying details (e.g., source code) of their applications to be shared.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
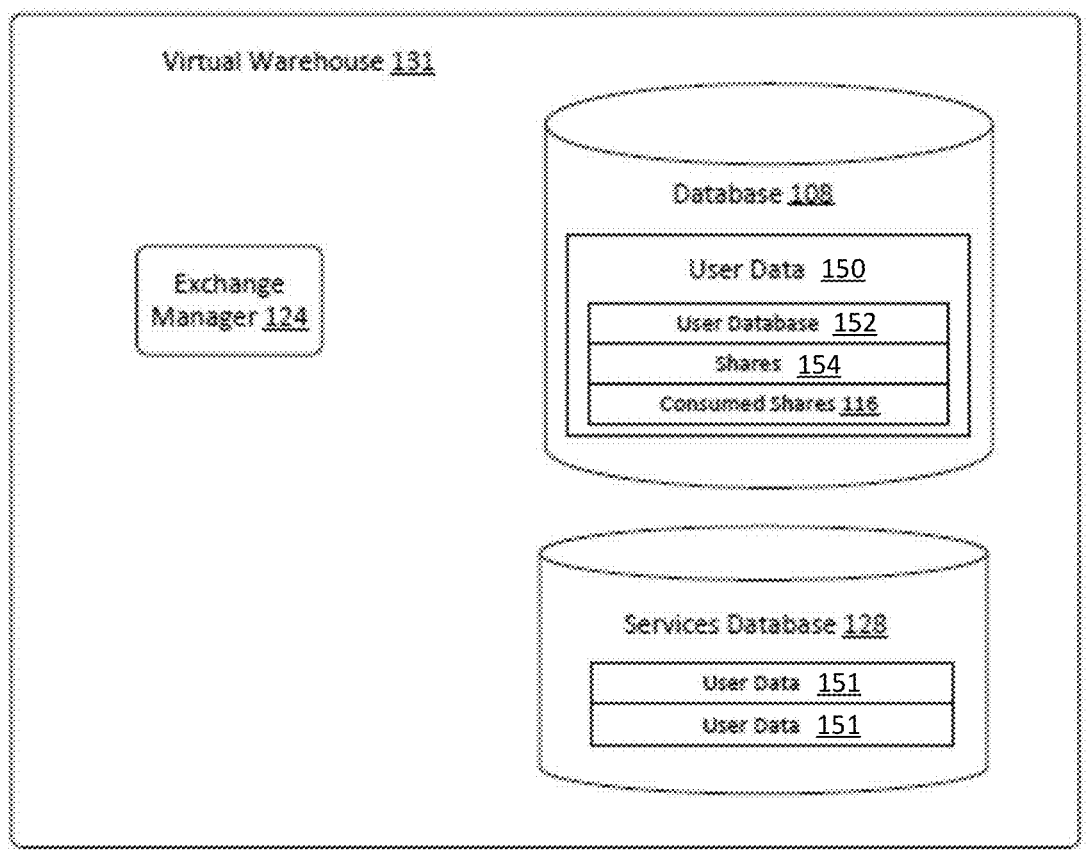
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data 150 may include a user database 152 of data stored and accessed by that user. The user database 152 may be subject to access controls such that only the owner of the data is allowed to change and access the database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
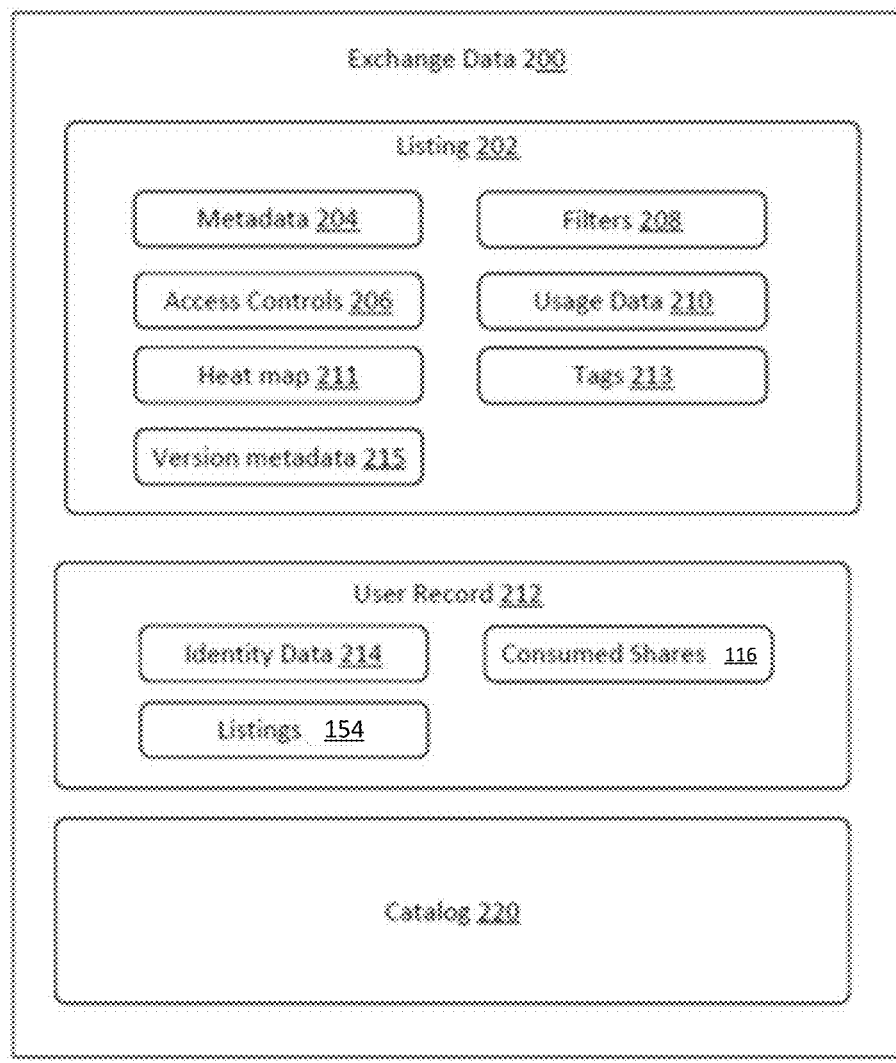
FIG. 2 is a schematic block diagram of data that may be used to implement a public or private data exchange, in accordance with some embodiments of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

A listing 202 may include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Figure 4:
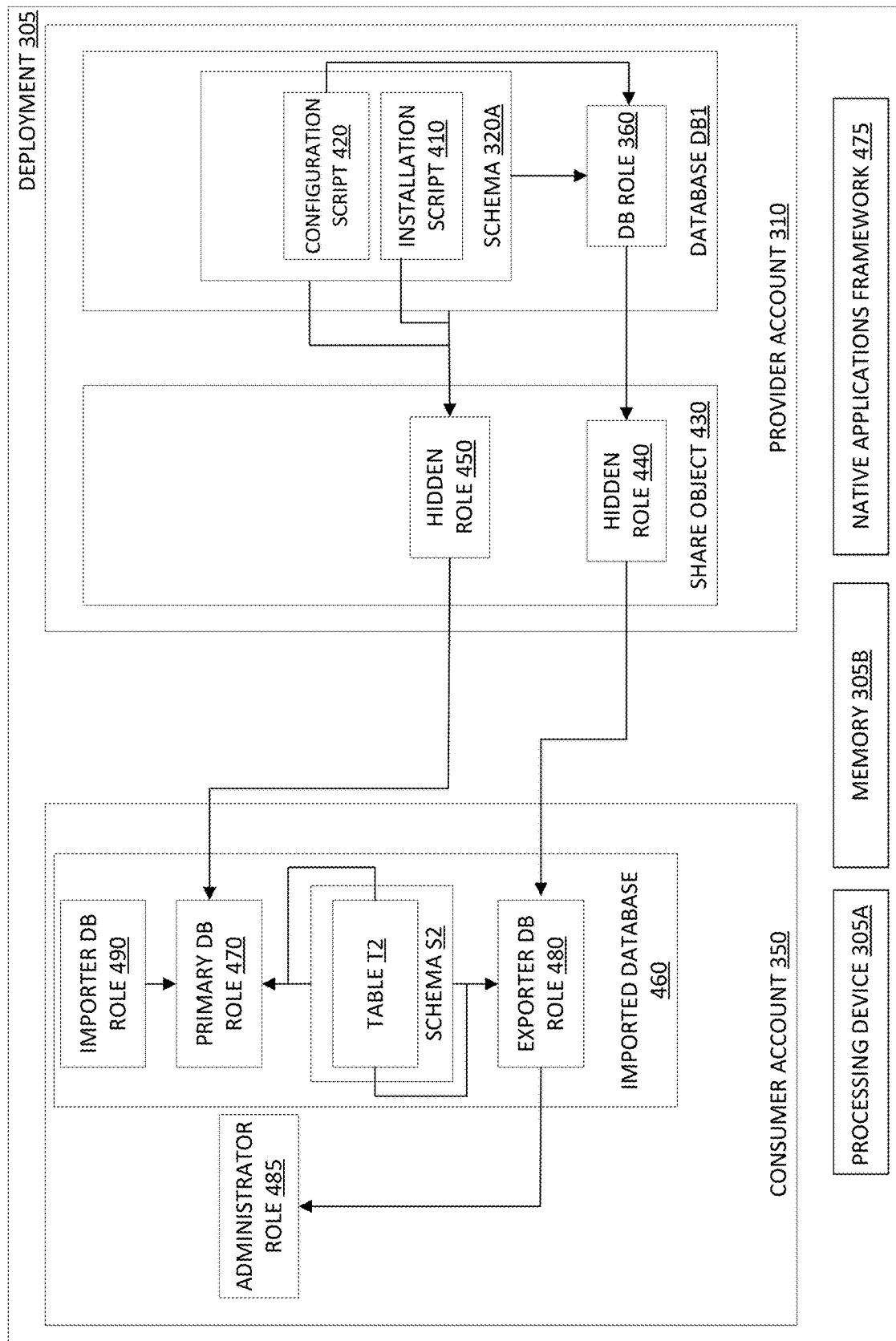
FIG. 4 is a block diagram of a deployment of a data exchange, illustrating application sharing techniques, in accordance with some embodiments of the present invention.
Figure 6:
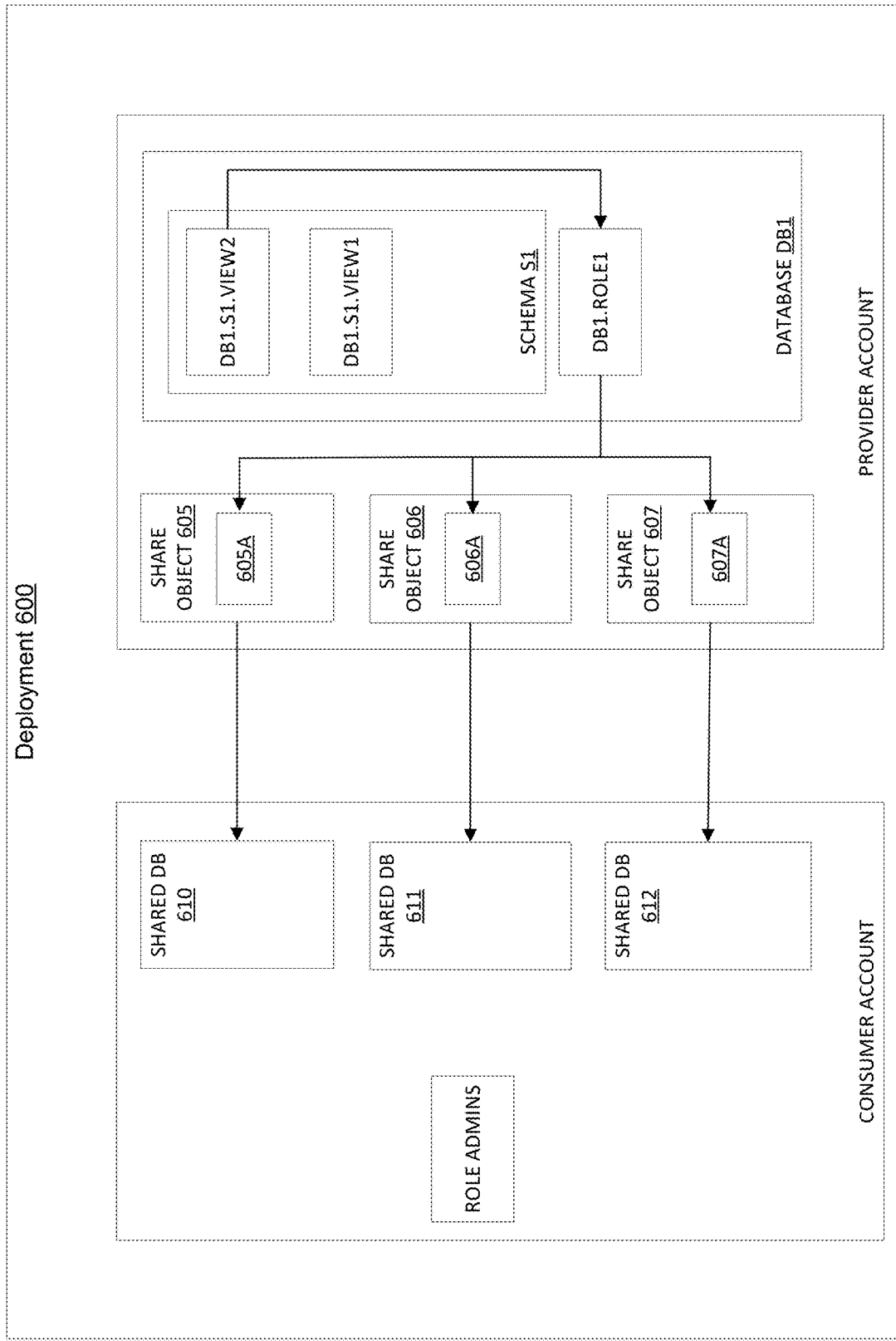
FIG. 6 is a diagram illustrating the use of hidden roles to grant a database role to a share object, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 116 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 116 of the user is permitted to access the data referenced by the listing but only a filtered version that only includes data associated with the identity data 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 116 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 128 and managed by the virtual warehouse 131.

The user record 212 may list shares associated with the user, e.g., reference listings 154 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 116 of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there a multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3:
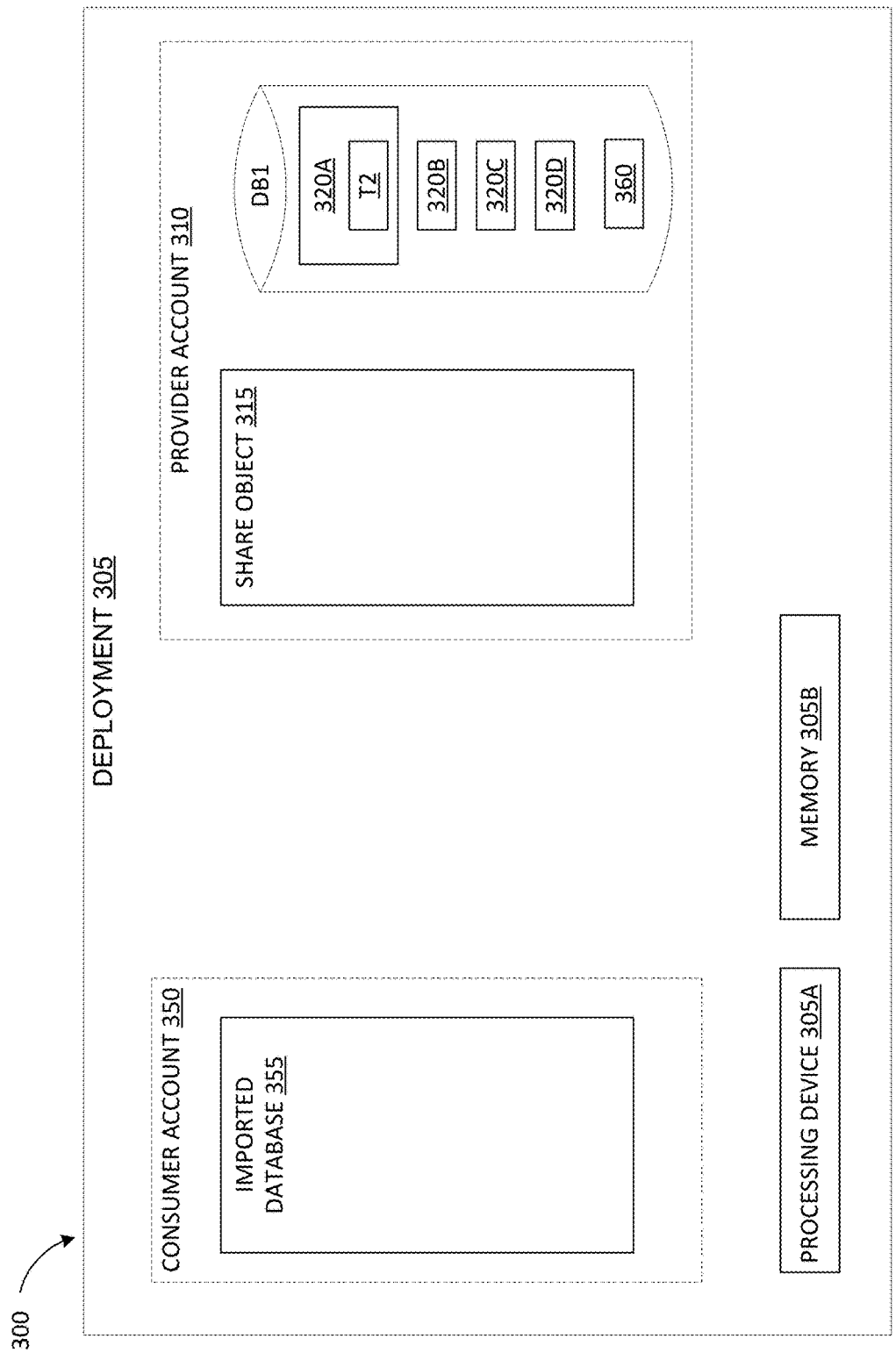
FIG. 3 is a schematic block diagram of deployment of a data exchange that illustrates consumer and provider managed data access techniques, in accordance with some embodiments of the present invention.

FIG. 3 illustrates a cloud environment 300 comprising a cloud deployment 305, which may comprise a similar architecture to cloud computing service 112 (illustrated in FIG. 1A) and may be a deployment of a data exchange or data marketplace. Although illustrated with a single cloud deployment, the cloud environment 300 may have multiple cloud deployments which may be physically located in separate remote geographical regions but may all be deployments of a single data exchange or data marketplace. Although embodiments of the present disclosure are described with respect to a data exchange, this is for example purpose only and the embodiments of the present disclosure may be implemented in any appropriate enterprise database system or data sharing platform where data may be shared among users of the system/platform.

The cloud deployment 305 may include hardware such as processing device 305A (e.g., processors, central processing units (CPUs), memory 305B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The cloud deployment 305 may comprise any suitable type of computing device or machine that has a programmable processor including, for example, server computers, desktop computers, laptop computers, tablet computers, smartphones, set-top boxes, etc. In some examples, the cloud deployment 305 may comprise a single machine or may include multiple interconnected machines (e.g., multiple servers configured in a cluster).

Databases and schemas may be used to organize data stored in the cloud deployment 305 and each database may belong to a single account within the cloud deployment 305. Each database may be thought of as a container having a classic folder hierarchy within it. Each database may be a logical grouping of schemas and a schema may be a logical grouping of database objects (tables, views, etc.). Each schema may belong to a single database. Together, a database and a schema may comprise a namespace. When performing any operations on objects within a database, the namespace is inferred from the current database and the schema that is in use for the session. If a database and schema are not in use for the session, the namespace must be explicitly specified when performing any operations on the objects. As shown in FIG. 3, the cloud deployment 305 may include a provider account 310 including database DB1 having schemas 320A-320D.

FIG. 3 also illustrates share-based access to objects in the provider account 310. The provider account 310 may create a share object 315, which includes grants to database DB1 and schema 320A, as well as a grant to a table T2 located in schema 320A. The grants on database DB1 and schema 320A may be usage grants and the grant on table T2 may be a select grant. In this case, the table T2 in schema 320A in database DB1 would be shared read-only. The share object 315 may contain a list of references (not shown) to various consumer accounts, including the consumer account 350.

After the share object 315 is created, it may be imported or referenced by consumer account 350 (which has been listed in the share object 315). Consumer account 350 may run a command to list all available share objects for importing. Only if the share object 315 was created with a reference to the consumer account 350, then the consumer account 350 reveal the share object using the command to list all share objects and subsequently import it. In one embodiment, references to a share object in another account are always qualified by account name. For example, consumer account 350 would reference a share object SH1 in provider account A1 with the example qualified name "A1.SH1." Upon the share object 315 being imported to consumer account 350 (shown as imported database 355), an administrator role (e.g., an account level role) of the consumer account 350 may be given a usage grant to the imported database 355. In this way, a user in account 350 with the administrator role 350A may access data from DB1 that is explicitly shared/included in the share object 315.

FIG. 3 also illustrates a database role 360. A database role may function similarly to an account level role, except for the fact that the database role may be defined inside a database (e.g., DB1 in the example of FIG. 3) or any appropriate database container (e.g., a schema). The database role 360 may be an object that is of a different type than an account level role or any other object (e.g., may be a new object type) and may be referenced using a qualifier based on the name of the database it is created within (e.g., DB1.ROLE1). Although the database role 360 may be similar to an account level role with respect to grants of privileges that can be assigned, the database role 360 may exist exclusively within database DB1 (the database in which it was defined). Thus, privileges granted to the database role 360 must be limited in scope to the objects contained in the database DB1 where the database role 360 is defined. The database role 360 may allow for the privileges provided by the share object 355 to be modularized to provide access to only certain objects of the database DB1 that the share object 355 has grants to.

When a database is replicated, a corresponding account level role could be replicated, or the database itself could be designated as the unit of replication. By defining the database role 360 within database DB1, a clear separation between the database role 360 and the other units of replication (e.g., account level roles) may be realized. Because privileges to a subset of the objects within database DB1 (and no other database) are granted to the database role 360, the database role 360 and the subset of the objects to which it has been granted privileges (e.g., modularized privileges) are all maintained in the database DB1. In addition, the executing role of provider account 310 must have a usage privilege on the database DB1 where the database role 360 is defined in order to resolve it.

In this way, if the provider account 310 grants to a consumer account access to a share object which has been granted privileges to the database DB1, then the consumer account may see all of the contents of DB1. However, by utilizing multiple database roles that are each granted privileges to particular objects (e.g., subsets of the objects) within the database DB1, the consumer account may only see/access objects for which privileges have been granted to the database roles the consumer account has been granted access to. A database role can be granted to account level roles, or other database roles that are within the same database. A database role cannot be granted to another database role from a different database.

In some scenarios a provider account may grant a database role to multiple share objects and a consumer account may import each of the multiple share objects to generate multiple imported databases in the consumer account. Subsequently, the consumer account may grant the imported database role in each imported database to the same account level role. However, in such situations, a different database object must be granted to each share object in a separate grant, otherwise a single revoke operation for a given share object/imported database will result in all grants of the database role to be revoked. To prevent this, embodiments of the present disclosure utilize a concept referred to as a hidden role when granting a database role to a share object. FIG. 6 is a block diagram of a deployment 600 in which the use of hidden roles to grant a database role to one or more share objects is illustrated. As shown in FIG. 6, when a provider account wishes to grant a database role (DB1.ROLE1) to a share object 605, it may create a new hidden role 605A. The hidden role 605A may be a database role or an account level role and may be anonymous (i.e., without a name). DB1.ROLE1 may be granted to the hidden role 605A and the hidden role 605A may be granted to share object 605. DB1.ROLE1 may be granted to each share object 605, 606, and 607 in this manner in order to establish a one to one relationship between database roles and share objects. By doing so, revocation of DB1.ROLE1 from e.g., share object 605 will not affect the grant of DB1.ROLE1 to share object 606 or 607. Once DB1.ROLE1 has been granted to each share object 605-607 in this manner, the consumer account may import each share object 605-607 and generate a shared database 610-612 based on each of the share objects 605-607 respectively. In addition, when a share object is deleted, or an account is removed from a share object, the use of hidden objects also ensures that only the grants provided through that share object are dropped. In short, any time a database role is granted to a share object, a hidden role for that granted database role and for the share object (i.e., share grantee) will be created.

In some embodiments, any objects granted by a provider account to a share object will not result in objects being automatically created in the consumer account. In this way, lifecycle problems can be avoided. For example, if a shared database role is renamed, there is no need for all existing automatically created objects to be renamed as well. In another example, if a database role is dropped, there is no need for all existing automatically created objects to be dropped as well. In a further example, if a new database role is added to the share object in the provider account, objects to which the new database role has been granted privileges will not automatically be created in all existing shared databases in consumer accounts.

Similar to the way that data can be shared from a provider account to a consumer account, applications can also be shared from a provider account to a consumer account. Embodiments of the present disclosure enable users of a data marketplace to build native applications that can be shared with other users of the data marketplace. The native applications can be published and discovered in the data marketplace like any other data listing, and consumers can install them in their account to serve their needs (e.g., data processing needs). This helps to bring data processing services and capabilities to consumers instead of requiring a consumer to share data to e.g., a service provider who can perform these data processing services and share the processed data back to the consumer. Stated differently, instead of an entity having to share data with a third party, having the third party run their service on it, and sending results back to the entity, the application functionality may be encapsulated, and then shared with the entity so that the entity does not have to share their potentially sensitive data.

As with sharing of data, sharing of a native application (hereinafter referred to as an application) may be performed using a shared container. A provider may define an application share object (same as a standard share object) and may couple a database comprising an installation script for installing the application to the application share object. In some embodiments, the installation script may be in the form of a stored procedure. Stored procedures may be similar to functions in the sense that they are both evaluated as expressions. Unlike functions however, stored procedures are used via CALL statements and do not appear in other statement types the way functions do (e.g., in a SELECT or WHERE part of a query). A primary feature of stored procedures is their ability to execute other queries and access their results. As with functions, a stored procedure may be created once and then can be executed many times. Indeed, a stored procedure implemented with e.g., Javascript can be thought of as a Javascript UDF augmented with the ability to issue other queries during execution of the Javascript body. When a consumer imports the database that is coupled to the application share object locally, it will trigger execution of the installation script which will build out all of the objects and procedures required for the application to run as discussed in further detail herein.

In some embodiments, there may be two types of stored procedures, owner's rights and caller's rights. An owner's rights stored procedure (e.g., example_sp) can be defined in one context and be called in another. A context may refer to the security and naming context that child jobs of the stored procedure are executed in. Such a context may comprise the account, role and the schema that is used for compiling a query (i.e., for name resolution and authorization). For example, the stored procedure example_sp may be defined in account A1, owned by role R1 and located in schema S1 (database DB1), and this combination of information is what is referred to as the owner's context. On the other hand, the invocation rights for example_sp in turn can be granted to any other role R2 in account A2 (which could be the same as A1). Role R2 may call example_sp from any default schema S2 (the session's default schema) using warehouse WH (session's default warehouse) via a query like "CALL DB1.S1.example_sp( );." The combination of the caller's account, role, schema and the warehouse is what is referred to as the caller's context. As opposed to an owner's right stored procedure, child jobs of a caller's rights stored procedure are executed in the context of the caller. Hence, there is no special treatment for them and the caller session's default context (i.e., schema, role and account) are used for name resolution and authorization purposes. Hence, unlike owner's rights type, the default warehouse can be changed during the execution of the body (by a child job).

FIG. 4 illustrates the cloud environment 300 in accordance with some embodiments of the present disclosure. Upon creating the database DB1 and the schema 320A, the provider account 310 may generate an installation script 410 and store it in the schema 320A as a stored procedure. The native applications framework 475 may enable the provider account 310 to indicate that a particular stored procedure is an installation script that will automatically be invoked with no arguments when a consumer with whom the stored procedure has been shared requests installation of the application as discussed in further detail herein.

The provider account 310 may define the installation script 410 with the necessary functionality to install the application (including any objects and procedures required by the application) in the consumer account 350. The provider account 310 may create an application share object 430 in the same manner that a normal share object is created, and attach the installation script 410 to the application share object 430. The provider account 310 may then grant the necessary privileges to the application share object 430 including usage on the database DB1, usage on the schema 320A, and usage on the installation script 410.

When the consumer account 350 runs a command to see the available shares, they may see the application share object 430 and may import the application share object 430 to create an imported database 460 from the application share object 430. In response to the creation of the imported database 460, the native applications framework 475 may automatically trigger execution of the installation script 410, which may create objects as well as tasks/procedures corresponding to the application functionality in the consumer account 350. For example, the installation script 410 may create a procedure that periodically contacts a third party API and retrieves data from the third party API to the imported database 460 for processing. As the application must access data and perform various functions, the imported database 460 is no longer a read-only database as it will not only include the application share object 430 from the provider account 310 (read only) but also have objects locally created inside the imported database via the stored procedures/installation script 410 that come with the application.

The native applications framework 475 may create a set of database roles as part of the installation of the application to assist with the sharing procedure. More specifically, the native applications framework 475 may create a primary database role 470, which may represent the application itself and may control execution of the installation script 410 and control the use or execution of any objects or procedures corresponding to the application functionality generated by the installation script 410. Stated differently, the primary database role 470 may have control over the application, analogous to a top level role in an account. The primary database role 470 may enable the installation script 410 to be executed in the context of the consumer account 350 but using a model that is similar to (but not the same as) the provider account 310's rights. It should be noted that the primary database role 470 is not executed using the provider account 310's (the owner's) right, since it is defined in the provider account 310, which does not have any privileges in the consumer account 350. It should also be noted that the primary database role 470 is not executed using the consumer account 350's (the caller's) right, because consumer account 350 may not wish to implicitly trust the installation script 410 and will not want the stored procedure corresponding to the installation script 410 to inherit any privileges granted to the consumer account 350. Indeed, the stored procedure is being executed in the context of the primary database role 470 (i.e., the application's right).

The native applications framework 475 may also create an exporter database role 480 to which the installation script 410 may grant permissions to certain objects and/or procedures (corresponding to the application functionality) that it (the installation script 410) has created during installation of the application. The native applications framework 475 may also create an importer database role 490. When objects/permissions of the consumer account 350 are granted to the application, the imported database role 490 may automatically acquire these objects/permissions. The native applications framework 475 may automatically grant the importer database role 490 to the primary database role 470 such that the primary database role 470 can assume all permissions granted to the application (via the importer database role 490). The native applications framework 475 may also automatically grant the exporter database role 480 to the admin role 485 (i.e., the role via which the consumer account 350 installed the application) which is an account level role of the consumer account 350. As a result, the certain objects and/or procedures granted to the exporter database role 480 by the installation script 410 may be visible to/accessible by the consumer account 350 (e.g., accessible by the admin role 485). For example, during installation of the objects and procedures required for the application to run, the installation script 410 may create a schema S2 and a table T2. The installation script 410 may be defined to grant usage access to schema S2 to the exporter database role 480 and grant select access on T2 to the exporter database role 480 so that it has select access to T2. By definition of the native applications framework 475's basic functionality, the exporter database role 480 is granted to the admin role 485 (i.e., the role that executed the installation script). Thus, the consumer account 350 (e.g., via the admin role 485) may have select access to the table T2.

In this way, the primary database role 470 may provide fine grained access to objects of the application share object 430 via the exporter database role 480 (as opposed to an all or nothing approach), as discussed in further detail herein. In addition, different sets may be assigned to different roles on the consumer side. It should be noted that when the consumer account 350 installs the application, the installation script 410 itself is not granted to the exporter database role 480, and so the consumer account 350 cannot see or access it in any way. Similarly, any data (e.g., objects, procedures, schemas, tables etc.) created by the installation script 410 is not by default visible/accessible to (e.g., any consumer roles of) the consumer account 350 unless the installation script 410 instructs them to be granted to the exporter database role 480. But if any objects or procedures are not granted to the exporter database role 480, then they are meant to be application usage only.

In the example of FIG. 4, the provider account 310 may grant the necessary privileges to the application share object 430 by granting usage on the database DB1, usage on the schema 320A, and usage on the installation script 410 to the hidden role 450 of the application share object 430. The consumer account 350 (via the administrator role 485) may create the imported database 460 from the application share object 430, in response to which the native applications framework 475 may automatically trigger execution of the installation script 410 in the consumer account 350. Because the installation script 410 has been granted to the hidden role 450, which in turn has been granted exclusively to the primary database role 470, the consumer account 350 cannot access the installation script 410. More specifically, the consumer account 350 cannot access the contents of the installation script 410, cannot see the contents of the installation script 410, and does not have any usage permissions on the installation script 410. However, the consumer account 350 can execute the installation script 410 because once they import the application share object 430, the native applications framework 475 automatically triggers execution of the installation script 410 in the consumer account 350, despite the fact that the consumer account 350 cannot actually access the underlying contents of the installation script 410. In addition, if other data/objects (e.g., tables etc.) are required for installation of the application, the provider account 310 may also grant these objects exclusively to the primary database role 470 and they too will not be visible to/accessible by the consumer account 350. In this way, by default the consumer account 350 does not have permission to see or execute any of the objects or procedures created by the installation script 410 during installation of the application. Unless the installation script 410 instructs certain objects and/or procedures created during installation of the application to be granted to the exporter database role 480, the consumer account 350 cannot view, access, or otherwise utilize them.

As a result of this, embodiments of the present disclosure also protect providers of applications who may not wish for the details (e.g., underlying code/logic) of their applications to be shared with consumers. Indeed, a provider account may wish for a consumer account to be able to execute an application, but may not want the content of the application to be accessible by the consumer account.

The consumer account 350 may create the necessary objects that will be used by the application such as credentials, API integration, and a warehouse. The consumer account 350 may also grant privileges necessary for the application to run (some privileges are granted on objects managed and owned by the consumer account 350) including usage on secrets, usage on the API Integration, usage on the warehouse, and privileges granted to the data application if it needs to access objects of the consumer account 350 or execute procedures in the consumer account 350. Once installed, the application may perform various functions in the consumer account 350 as long as the consumer account 350 has authorized it. The application can act as an agent, and take any action that any role on the consumer account

350 could take such as e.g., set up a task pipeline, set up data ingestion (e.g., via Snowpipe™ ingestion), or any other defined functionality of the application. The application may act on behalf of the consumer account 350 and execute procedures in a programmatic way.

As further shown in FIG. 4, the provider account 310 may create a database role 360 and may grant usage on the configuration script 420 (also a stored procedure) to the database role 360. The provider account 310 has also granted the database role 360 to the hidden role 440 of the application share object 430. The configuration script 420 may function to fine tune how the application functions. For example, if the function of the application is ingesting data into the consumer account 350, the consumer may want to configure what the frequency of ingestion is, or what tables they want to ingest, etc. This functionality may be provided by the configuration script 420. The provider account 310 may grant the hidden role 440 directly to the exporter database role 480. In this way, a consumer with the administrator role 485 active can execute the shared configuration script 420 stored procedure, using the primary database role 470 as the executing role.

Always executing shared stored procedures (e.g., installation script 410) using the primary database role 470 provides a measure of safety for the consumer account 350 because the privileges granted to the primary database role 470 are either on objects/procedures of the application or on consumer objects, that have been granted specifically by the consumer account 350. In this model, the installation script 410 (which the consumer account 350 will not be able to access or analyze) will be restricted to a sandbox like perimeter, without the consumer account 350 having to trust the code of the installation script 410 stored procedure.

When providers upgrade the logic and code of their shared applications, the native applications framework 475 may function to ensure that the upgraded functionality is replicated on the consumer side. In some embodiments, the native applications framework 475 may take periodic "snapshots" of the application, and save each one. Each snapshot may be analogous to a version of the application, and may include metadata regarding that version of the application. The metadata of each version may be stored and used to transition/migrate to a new version of the application. Some examples of the kind of metadata persisted by the native applications framework 475 may include version data of the application version and status data of the application version. For example, the status data may include an enabled flag that indicates that the application is enabled and in an active state and a disabled flag that indicates that the application is in a dormant state with no user tasks currently active and any invocation to the application or local/shared objects resulting in an error. When the application is upgraded, it may only need to upgrade the objects in the imported database to which it has privileges on, and may not modify any account level objects. In some embodiments, an application upgrade may include pausing the state of the application, performing any necessary modification, addition, and/or removal of objects and configurations of the application, and then resuming the application. The upgrade may require additional consumer local objects/permissions to be granted to the application, which is performed via the importer database role 490 discussed in further detail hereinabove. In some embodiments, the native applications framework 475 may prompt the user for the required additional consumer local objects/permissions to be granted to the application.

In some embodiments, the native applications framework 475 may provide functionality to log usage metrics of applications that detail how consumers use those applications and provide such usage metrics logs to the provider. When a provider shares an application (e.g., by creating a listing for it in the data exchange), they may include such usage metrics in the metadata of the listing so that consumers will have visibility into the resources consumed by the application and can set quotas for budgeting their consumption. For example, the provider may provide an indication of the resources (e.g., compute, storage resources) required to run the application in the listing metadata and any consumers interested in the application may set their respective quotas accordingly.

In some embodiments, the native applications framework 475 may monitor execution of the application and generate execution logs, which may be provided to the consumer. In some embodiments, in response to determining that a shared application is not functioning properly, a consumer may (via the native applications framework 475) programmatically suspend execution of the application and share their execution logs with the provider. The native applications framework may scrub the execution logs of personal/sensitive data before sharing them with the provider. The provider may fix any bugs/issues in the application using the shared execution logs, and share the updated version of the application. The consumer may programmatically upgrade to the updated version of the application as discussed herein. In addition, the application may generate metrics which the consumer may monitor (e.g., via the native applications framework 475). The native applications framework 475 may also enable the consumer to define criteria for issuing alerts e.g., when certain metrics are reaching a threshold. The application may also generate incidents to consumers when it encounters exceptions.

In some embodiments, the native applications framework 475 may also leverage extensibility mechanisms such as e.g., a connector function to call out to any appropriate third party services/endpoints. The native applications framework 475 may leverage any language supported by the data exchange (e.g., Javascript, Java, and Python, among others), thereby enabling native applications to be written in any language supported by the data exchange.

As can be seen, embodiments of the present disclosure enable providers to develop an application and procedures for setting up and installing the application's functionality using data exchange primitives. A provider may "advertise" an application using a listing as discussed above with respect to normal data sharing, and applications can be made available to consumers via a sharable container with appropriate RBAC controls to ensure that only access to public artifacts of the native applications are granted to the consumer. Consumers may discover these applications programmatically and install them into their accounts as a sandboxed container. Applications can then be configured programmatically with authorization credentials, compute resources required by the application instance, and other application specific configurations that may require external setup. Consumers may dynamically configure and manage the application lifecycle programmatically.

Figure 5C:
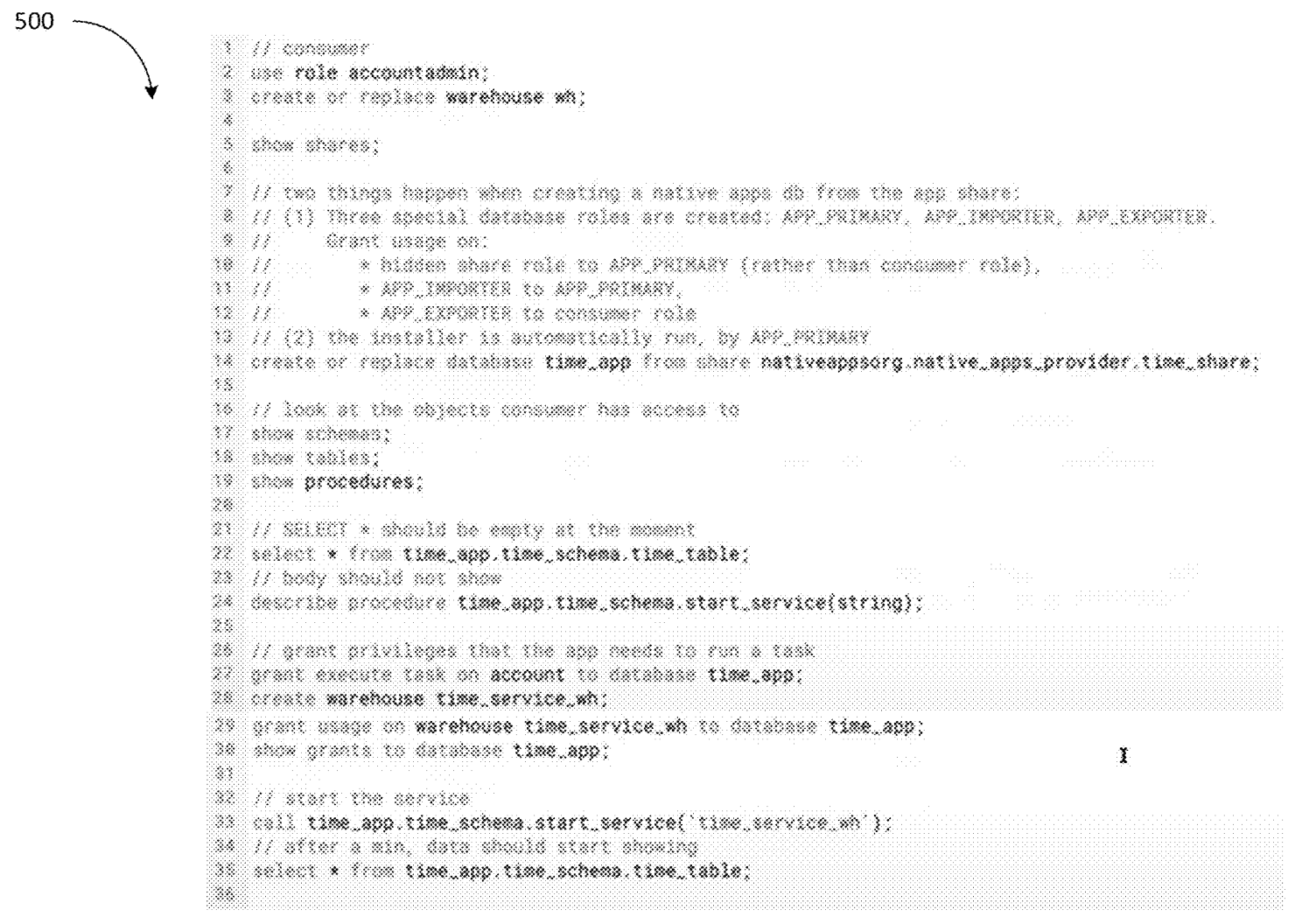

FIGS. 5A-5C illustrate a code implementation of an example application share process 500, in accordance with some embodiments of the present disclosure. FIG. 5A illustrates provider side code of the example share process. As shown in FIG. 5A, a provider may create a database ("create database time_DB") and then create a schema within the database ("create schema time_db.installer_schema) in which the installation script 505 will reside. The provider may define the installation script (time_db.installer_schema.installer( )) with the desired functionality of the application.

In the example of FIGS. 5A-5C, the basic function of the application is to periodically insert a timestamp into a table. More specifically (with continued reference to FIG. 5A), the provider may define the installation script 505 to create a timestamp schema ("create schema time_schema") in which the application may execute. The provider may also define the installation script 505 to create a timestamp table in which timestamps can be recorded ("create table time_schema.time_table(ts_timestamp)") and create a timestamp insertion procedure that monitors and inserts the timestamps into the table ("create procedure time_schema.record_time( )"). The installation script may further be defined to create a start service procedure ("create procedure time_schema.start_service(wh_name string)") that periodically calls the timestamp insertion procedure.

The installation script 505 may also be defined with functionality to grant access to the schema which the installation script 505 is stored in ("grant usage on schema time_schema to database role app_exporter"), the start service procedure ("grant usage on procedure time_schema.start_service(string) to database role app_exporter"), and the timestamp table ("grant select on table time_schema.time_table to database role app_exporter") to an exporter database role (app_exporter) created by the native applications framework as discussed hereinabove. This is because the consumer account does not by default have access to any of these objects or procedures, as discussed in further detail hereinabove. As can be seen in FIG. 5A, the installation script 505 does not grant access to the timestamp insertion procedure, and so upon installation of the application, the consumer account 350 cannot see the underlying code of the timestamp insertion procedure or otherwise access the timestamp insertion procedure directly, but can call it using the start service procedure.

Referring now to FIG. 5B, the provider may create an application share in the same manner that a normal share is created ("create share time share installer"), and attach the installation script 505 to the application share (time_db.installer_schema.installer( ). The provider may then grant the necessary privileges (shown as privilege set 510 in FIG. 5B) to the application share including usage on the database (time_db), usage on the schema (installer_schema), and usage on the installation script 505 (installer_schema.installer).

FIG. 5C illustrates consumer side code of the example application share process 500. As shown in FIG. 5C, when the consumer runs a command to see the available shares ("show shares"), they may see the share time.share and may create a database (an imported database) called time_app from the share time.share ("create or replace database time_app from share nativeappsorg.native_apps_provider.time share"). This will automatically trigger the installation process which creates the timestamp schema (time_schema), the timestamp table (time_table), and the start service procedure (start_service(string)). If the consumer runs a command to show schemas ("show schemas"), they will see the schema time_schema. If the consumer runs a command to show tables ("show tables") they will see the timestamp table (time_table). And if the consumer runs a command to show procedures ("show procedures") they will see the start service procedure (start_service(string)), but will not see the timestamp insertion procedure (record_time( )).

At this point, the consumer account will grant the privileges necessary for the application to run tasks (e.g., the start service procedure) in the consumer account ("grant execute task on account to database time_app") and grant usage privileges on a data warehouse (imported database) where the application is to be executed ("grant usage on warehouse time_service_wh to database time_app"). The consumer account may execute the start service procedure which may run the timestamp insertion procedure.

Figure 7:
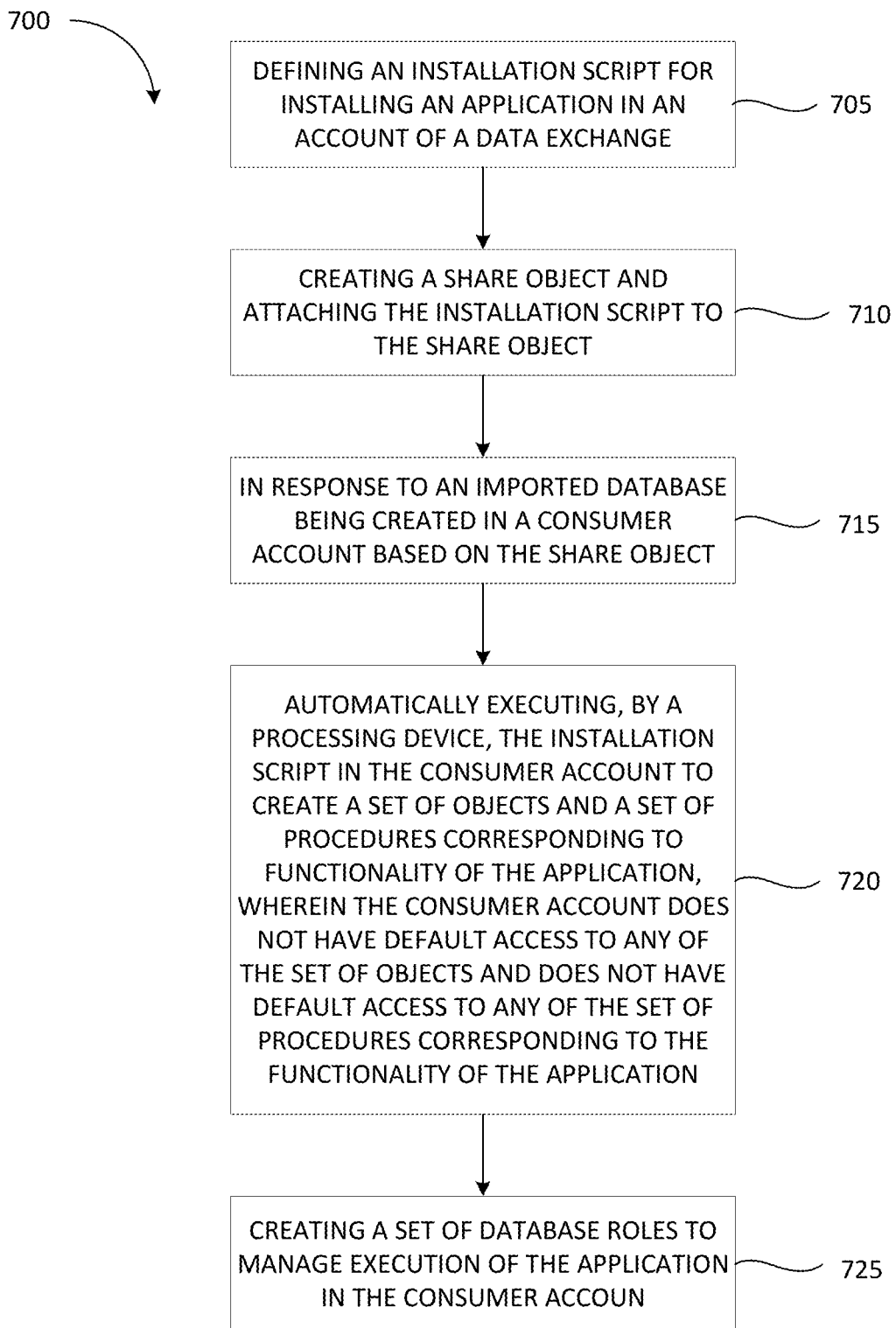
FIG. 7 is a flow diagram of a method for sharing applications among users of a data exchange, in accordance with some embodiments of the present invention.

FIG. 7 is a flow diagram of a method 700 for sharing an application among users of a database, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by a processing device of cloud deployment 305 (illustrated in FIGS. 3 and 4).

Referring simultaneously to FIG. 4, upon creating the database DB1 and the schema 320A, at block 705 the provider account 310 may generate an installation script 410 and store it in the schema 320A as a stored procedure. As discussed in further detail herein, the provider account 310 may define the installation script 410 with the necessary functionality to install the application (including any objects and procedures required by the application) in the consumer account 350. At block 710, the provider account 310 may create an application share object 430 in the same manner that a normal share object is created, and attach the installation script 410 to the application share object 430. The provider account 310 may then grant the necessary privileges to the application share object 430 including usage on the database DB1, usage on the schema 320A, and usage on the installation script 410. When the consumer account 350 runs a command to see the available shares, they may see the application share object 430 and may import the application share object 430 to create an imported database 460 from the application share object 430. At block 715, in response to the creation of the imported database 460, at block 720 the native applications framework 475 may automatically trigger execution of the installation script 410, which may create objects as well as tasks/procedures corresponding to the application functionality in the consumer account 350. For example, the installation script 410 may create a procedure that periodically contacts a third party API and retrieves data from the third party API to the imported database 460 for processing. As the application must access data and perform various functions, the imported database 460DB1 is no longer a read-only database as it will not only include the application share object 430 from the provider account 310 (read only) but also have objects locally created inside the imported database via the stored procedures/installation script 410 that come with the application.

At block 725, the native applications framework 475 may create a set of database roles as part of the installation of the application to assist with the sharing procedure. More specifically, the native applications framework 475 may create a primary database role 470, which may represent the application itself and may control the use or execution of any objects or procedures corresponding to the application functionality. Stated differently, the primary database role 470 may have control over the application, analogous to a top level role in an account. The native applications framework 475 may also create an exporter database role 480 to which the installation script 410 may grant permissions to certain objects and/or procedures that it (the installation script 410) has created during installation of the application. The native applications framework 475 may also create an importer database role 490. When objects/permissions of the consumer account 350 are granted to the application, the imported database role 490 may automatically acquire these objects/permissions. The native applications framework 475 may automatically grant the importer database role 490 to the primary database role 470 such that the primary database role 470 can assume all permissions granted to the application (via the importer database role 490). The native applications framework 475 may automatically grant the exporter database role 480 to the admin role 485 (i.e., the role via which the consumer account 350 installed the application) which is an account level role of the consumer account 350. As a result, the certain objects and/or procedures granted to the exporter database role 480 by the installation script 410 may be visible to/accessible by the consumer account 350 (e.g., accessible by the admin role 485). For example, during installation of the objects and procedures required for the application to run, the installation script 410 may create a schema S2 and a table T2. The installation script 410 may be defined to grant usage access to schema S2 to the exporter database role 480 and the importer database role 490, as well as grant select access on T2 to the exporter database role 480 so that it has select access to T2. By definition of the native applications framework 475's basic functionality, the exporter database role 480 is granted to the admin role 485 (i.e., the role that executed the installation script). Thus, the consumer account 350 (e.g., via the admin role 485) may have select access to the table T2.

In this way, the primary database role 470 may provide fine grained access to objects of the application share object 430 via the exporter database role 480 (as opposed to an all or nothing approach), as discussed in further detail herein. It should be noted that when the consumer account 350 installs the application, the installation script 410 itself is not granted to the exporter database role 480, and so the consumer account 350 cannot see it. Similarly, any data (e.g., objects, schemas, tables etc.) created by the installation script 410 is not by default visible/accessible to any consumer roles unless the installation script 410 instructs them to be granted to the exporter database role 480. But if any objects or procedures are not granted to the exporter database role 480, then they are meant to be application usage only.

Figure 8:
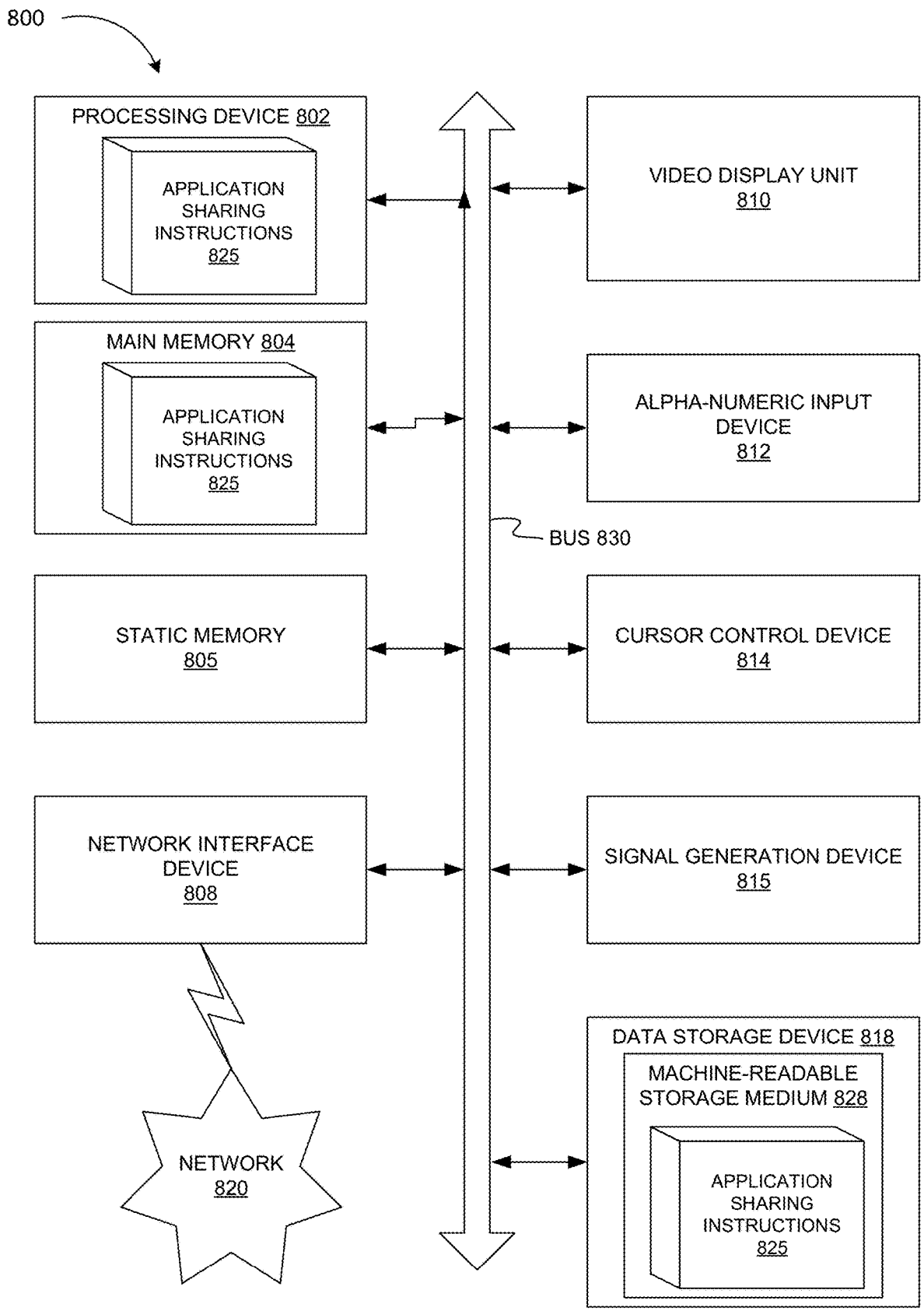
FIG. 8 is a block diagram of an example computing device that may perform one or more of the operations described herein, in accordance with some embodiments of the present invention.

FIG. 8 illustrates a diagrammatic representation of a machine in the example form of a computer system 800 within which a set of instructions, for causing the machine to perform any one or more of the methodologies discussed herein for replicating a share object to a deployment. More specifically, the machine may modify a share object of a first account into a global object wherein the share object includes grant metadata indicating share grants to a set of objects of a database. The machine may create, in a second account located in a deployment, a local replica of the share object on the deployment based on the global object and replicate the set of objects of the database to a local database replica on the deployment; and refresh the share grants to the local replica of the share object.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may be representative of a server.

The exemplary computer system 800 includes a processing device 802, a main memory 804 (e.g., read-only memory (ROM), flash memory, dynamic random access memory (DRAM), a static memory 805 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 800 may further include a network interface device 808 which may communicate with a network 820. The computing device 800 also may include a video display unit 810 (e.g., a liquid crystal display (LCD) or a cathode ray tube (CRT)), an alpha-numeric input device 812 (e.g., a keyboard), a cursor control device 814 (e.g., a mouse) and an acoustic signal generation device 815 (e.g., a speaker). In one embodiment, video display unit 810, alphanumeric input device 812, and cursor control device 814 may be combined into a single component or device (e.g., an LCD touch screen).

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute application sharing instructions 825, for performing the operations and steps discussed herein.

The data storage device 818 may include a machine-readable storage medium 828, on which is stored one or more sets of application sharing instructions 825 (e.g., software) embodying any one or more of the methodologies of functions described herein. The application sharing instructions 825 may also reside, completely or at least partially, within the main memory 804 or within the processing device 802 during execution thereof by the computer system 800; the main memory 804 and the processing device 802 also constituting machine-readable storage media. The application sharing instructions 825 may further be transmitted or received over a network 820 via the network interface device 808.

The machine-readable storage medium 828 may also be used to store instructions to perform a method for determining functions to compile, as described herein. While the machine-readable storage medium 828 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
defining an installation script to install an application in a data exchange implemented in a cloud computing environment, wherein the data exchange comprises a provider account and a consumer account, wherein the provider account is to share a data asset with the consumer account;
creating a share object of a database in the provider account and attaching the installation script to the share object, wherein the share object includes information used to share the data asset in the database with the consumer account; and
replicating, by a processing device, the database from the provider account to the consumer account based on the share object, wherein the installation script executes within the consumer account to install the application in the consumer account of the data exchange responsive to the replicating, and wherein execution of the application in the consumer account is managed by a set of database roles that determine access privileges granted to the application for accessing the data asset in the database inside the consumer account, the application to perform a data processing service relative to the data asset in the database.

2. The method of claim 1, wherein the application comprises a set of procedures that determine functionality of the application, and wherein the consumer account does not have default access to any of the set of procedures.

3. The method of claim 2, wherein the set of database roles comprises:
a first database role to control execution of the installation script in the consumer account; and
a second database role to which the installation script grants access to one or more of the set of procedures corresponding to the functionality of the application, wherein the second database role is granted to an account level role of the consumer account.

4. The method of claim 3, wherein the second database role is used to execute the one or more of the set of procedures corresponding to the functionality of the application.

5. The method of claim 3, wherein the set of database roles further comprises a third database role to which objects and permissions of the consumer account are granted in response to the objects and permissions of the consumer account being granted to the application.

6. The method of claim 5, wherein the third database role is granted to the first database role so that the first database role assumes the grants to the objects and permissions of the consumer account.

7. The method of claim 3, wherein:
usage of a configuration script is granted to a hidden role of the share object;
the hidden role of the share object is granted to the second database role; and
the configuration script is to execute using the second database role to modify the functionality of the application.

8. A system comprising:
a memory; and
a processing device operatively coupled to the memory, the processing device to:
define an installation script to install an application in a data exchange implemented in a cloud computing environment, wherein the data exchange comprises a provider account and a consumer account, wherein the provider account is to share a data asset with the consumer account;
create a share object of a database in the provider account and attach the installation script to the share object, wherein the share object includes information used to share the data asset in the database with the consumer account; and
replicate the database from the provider account to the consumer account based on the share object, wherein the installation script executes within the consumer account to install the application in the consumer account of the data exchange responsive to the replication, and wherein execution of the application in the consumer account is managed by a set of database roles that determine access privileges granted to the application for accessing the data asset in the database inside the consumer account, the application to perform a data processing service relative to the data asset in the database.

9. The system of claim 8, wherein the application comprises a set of procedures that determine functionality of the application, and wherein the consumer account does not have default access to any of the set of procedures.

10. The system of claim 9, wherein the set of database roles comprises:
a first database role to control execution of the installation script in the consumer account; and
a second database role to which the installation script grants access to one or more of the set of procedures corresponding to the functionality of the application, wherein the second database role is granted to an account level role of the consumer account.

11. The system of claim 10, wherein the set of database roles further comprises a third database role to which objects and permissions of the consumer account are granted in response to the objects and permissions of the consumer account being granted to the application.

12. The system of claim 11, wherein the processing device is further to:
grant the third database role to the first database role so that the first database role assumes the grants to the objects and permissions of the consumer account.

13. The system of claim 10, wherein:
usage of a configuration script is granted to a hidden role of the share object;
the hidden role of the share object is granted to the second database role; and
the configuration script is to execute using the second database role to modify the functionality of the application.

14. The system of claim 9, wherein the processing device is further to generate a listing in the data exchange for sharing the application.

15. A non-transitory computer-readable medium having instructions stored thereon which, when executed by a processing device, cause the processing device to:
define an installation script to install an application in a data exchange implemented in a cloud computing environment, wherein the data exchange comprises a provider account and a consumer account, wherein the provider account is to share a data asset with the consumer account;
create a share object of a database in the provider account and attach the installation script to the share object, wherein the share object includes information used to share the data asset in the database with the consumer account; and replicate the database from the provider account to the consumer account based on the share object, wherein the installation script executes within the consumer account to install the application in the consumer account of the data exchange responsive to the replication, and wherein execution of the application in the consumer account is managed by a set of database roles that determine access privileges granted to the application for accessing the data asset in the database inside the consumer account, the application to perform a data processing service relative to the data asset in the database.

16. The non-transitory computer-readable medium of claim 15, wherein the application comprises a set of procedures that determine functionality of the application, and wherein the consumer account does not have default access to any of the set of procedures corresponding to the functionality of the application.

17. The non-transitory computer-readable medium of claim 16, wherein the set of database roles comprises:
a first database role to control execution of the installation script in the consumer account; and
a second database role to which the installation script grants access to one or more of the set of procedures corresponding to the functionality of the application, wherein the second database role is granted to an account level role of the consumer account.

18. The non-transitory computer-readable medium of claim 17, wherein the set of database roles further comprises a third database role to which objects and permissions of the consumer account are granted in response to the objects and permissions of the consumer account being granted to the application.

19. The non-transitory computer-readable medium of claim 18, wherein the third database role is granted to the first database role so that the first database role assumes the grants to the objects and permissions of the consumer account.

20. The non-transitory computer-readable medium of claim 17, wherein:
usage of a configuration script is granted to a hidden role of the share object;
the hidden role of the share object is granted to the second database role; and
the configuration script is to execute using the second database role to modify the functionality of the application.

* * * * *